United States Patent [19]

Straub

[11] 4,100,900

[45] Jul. 18, 1978

[54] METHOD AND APPARATUS FOR CONTROLLING THE AIR OF COMBUSTION OF CARBURETOR ENGINES

[76] Inventor: Wilhelm Straub, Bruno de Ezeta 12, Circuito Navegantes, Cd. Satelite, Edo, Mexico

[21] Appl. No.: 691,786

[22] Filed: Jun. 1, 1976

[51] Int. Cl.² .......................................... F02M 23/04
[52] U.S. Cl. ................................. 123/124 R; 123/106
[58] Field of Search ............... 123/124 R, 106, 117 A; 137/480 D, 119 D, 119 DB, 97 B

[56] References Cited

U.S. PATENT DOCUMENTS

| 1,361,771 | 12/1920 | O'Malley | 123/124 R |
| 1,963,628 | 6/1934 | Mallory | 123/124 R |
| 2,152,028 | 3/1939 | Church | 123/124 R |
| 2,311,351 | 2/1943 | Schmelz | 123/124 R |
| 2,688,957 | 9/1954 | Culp | 123/124 R |
| 3,034,492 | 5/1962 | Harmon | 123/124 R |
| 3,414,242 | 12/1968 | Bouteleux | 123/124 R |

Primary Examiner—Wendell E. Burns
Attorney, Agent, or Firm—Bacon & Thomas

[57] ABSTRACT

A valve is connected to an inlet opening on the conduit means leading from the carburetor of an internal combustion engine assembly to the combustion chamber of the engine. The valve has an air inlet thereon, and is operable by a conventional pneumatic vacuum actuator in response to the rotational speed of the engine to admit additional air of combustion to the conduit means for blending with the fuel and air mixture flowing therethrough from the carburetor to the combustion chamber. The additional air of combustion, which is proportional to the engine speed, improves combustion within the engine and thereby increases fuel efficiency while minimizing the production of pollutants.

2 Claims, 4 Drawing Figures

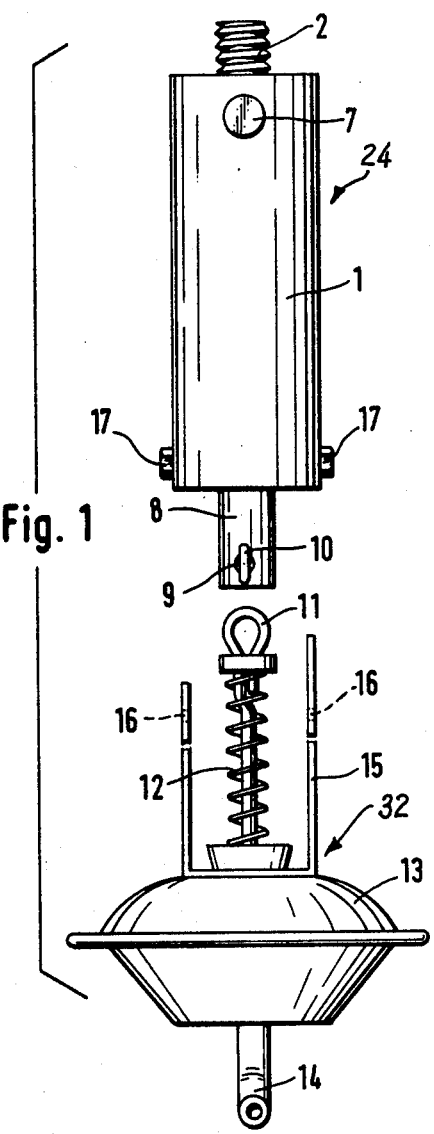
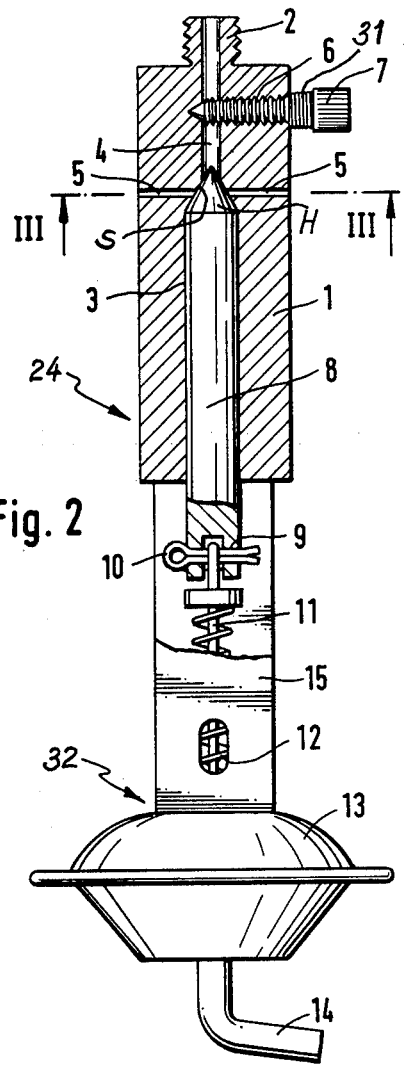
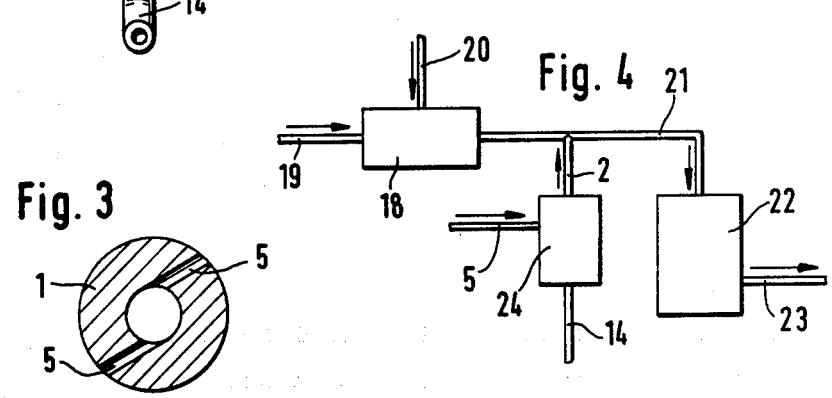

METHOD AND APPARATUS FOR CONTROLLING THE AIR OF COMBUSTION OF CARBURETOR ENGINES

BACKGROUND OF THE INVENTION

1. Field of the Invention

The present invention relates generally to internal combustion engines, and the means for supplying fuel and air to the combustion chambers of such engines. More particularly, it relates to carburetor engines, and to a method and apparatus for controlling the air of combustion supplied to the engine in response to engine rotational speed, whereby to maximize fuel utilization and minimize the production of pollutants.

2. Description of the Prior Art

In the conventional carburetor engine, the air of combustion is fed through the carburetor by the vacuum in the intake pipe. In such a conventional arrangement, however, particularly in the upper ranges of engine rotational speed, the ratio between the supplied fuel and the supplied air of combustion is too high, i.e., the fuel and air mixture is too rich. This leads to incomplete combustion of the fuel, and to an increased carbon monoxide content in the exhaust gas. Moreover, the utilization of the fuel is not optimum, since the unfavorable ratio between fuel and air of combustion leads to a high fuel consumption.

It has already been proposed to solve this problem by direct fuel injection. However, the technical expense required with this approach is considerable, and in particular the high pressure pumps and the control mechanisms therefor require a substantial expenditure in both labor and materials to manufacture and assemble. In addition, such highly stressed precision devices are particularly susceptible to operating trouble, and often have only a limited life.

There is need, therefore, for a new approach to solving the problem of having too rich a fuel and air mixture in carburetor engines at the higher engine speeds, and the present invention is intended to satisfy that need.

SUMMARY OF THE INVENTION

One object of the present invention is to provide a method and apparatus for controlling the air of combustion of a carburetor engine in such a manner that at increasing rotational speeds, the fuel and air mixture becomes more lean. In this manner, optimum combustion and utilization of the fuel can be achieved. The invention achieves this goal in a simple manner, and is adaptable for use with conventional engines which are already in operation.

It is the principal object of the present invention to provide a method and apparatus for controlling the air of combustion of a carburetor engine, to maximize fuel utilization and minimize the production of pollutants.

Another object is to provide a method and apparatus for controlling the air of combustion of a carburetor engine so as to increase the supply of air as engine speed increases, thereby effecting a leaning of the fuel and air mixture.

A further object is to provide a method and apparatus for controlling the air of combustion of a carburetor engine which can be utilized on existing engines.

Yet another object is to provide an apparatus for controlling the air of combustion of a carburetor engine which is economical to construct and install, and relatively maintenance-free in operation.

In the invention additional air of combustion is introduced into the conduit means connecting the carburetor with the engine combustion chamber, the volume of the additional air of combustion being controlled in direct dependency upon the rotational speed of the engine. Preferably, the apparatus for introducing the additional air of combustion is controlled by means of the vacuum of the pneumatic spark control system with which internal combustion engines are normally fitted, and which is directly responsive to engine speed.

The conduit means connecting the carburetor with the combustion chamber has an inlet opening therein, to which a valve is connected. The valve has air inlet openings that are preferably arranged tangentially to the valve bore to induce turbulence in air flowing therethrough, and includes a valve stem. The valve stem is connected against the pressure of a spring to the diaphragm of a conventional pneumatic actuator of the kind in widespread use with pneumatic spark control systems, and the actuator is preferably connected to the same vacuum line that operates the engine spark control system. The outlet bore of the valve has a proportioning screw mounted therein, for adjusting the flow of air therethrough into the conduit means.

Other objects and many of the attendant advantages of the present invention will become readily apparent from the following Description of the Preferred Embodiments, when taken in conjunction with the accompanying drawings.

BRIEF DESCRIPTION OF THE DRAWINGS

FIG. 1 is a side elevational view of the apparatus of the invention, with the pneumatic actuator being shown disconnected from the valve;

FIG. 2 is a front elevational view of the apparatus of FIG. 1 in assembled relationship, with portions of the apparatus being illustrated in section to show the construction thereof;

FIG. 3 is a sectional view taken on the line III—III of FIG. 2, showing the tangential arrangement of the air inlet bores; and FIG. 4 is a diagrammatic block diagram, showing how the apparatus of the invention is connected with the carburetor and the engine block of an engine assembly.

DESCRIPTION OF THE PREFERRED EMBODIMENTS

Referring now to FIGS. 1 and 2, the apparatus of the invention includes a valve 24 having a valve body 1, the upper end of which terminates in a reduced diameter threaded nipple 2. The valve body 1 has a central main valve bore 3 which receives a valve stem 8, a reduced diameter outlet bore 4 which extends through the threaded nipple 2, and a frusto-conical valve seat S which connects the main bore 3 with the outlet bore 4.

The valve body 1 further has a plurality of air inlet bores or openings 5 therein, which intersect the valve seat S. As shown in FIG. 3, the air inlet openings 5 are preferably arranged tangentially to the valve bore 3, whereby to produce turbulence in air flowing through the valve that assures a more intense mixing of the fuel and the air of combustion. While two air inlet openings 5 are shown, three or more can be provided, if desired.

In the portion of the valve body 1 above the valve seat S, a lateral tapped bore 6 is provided which intersects the outlet bore 4 and receives a proportioning screw 7. A spring 31 is compressed between the head of the screw 7 and the valve body 1, and functions to prevent accidental turning of the screw. The proportioning screw 7 permits regulation of the total air volume fed through the outlet bore 4, and makes it possible to adjust the apparatus to the specific requirements of an individual engine for air of combustion.

The valve stem 8 is moveable within the bore 3, and functions to control the amount of air flowing into the outlet bore 4. The stem 8 has a head H thereon shaped similarly to the valve seat S, the valve seat and the head on the stem 8 being arranged so that a passage of increasing cross-sectional area is opened between the bores 3 and 4 as the stem 8 moves downwardly away from the valve seat S. The lower end of the valve stem 8 has a transverse bore 9 therethrough, and is connected by a split pin 10 to the operating stem 11 of a pneumatic actuator unit 32.

The pneumatic actuator unit 32 is of conventional construction, and is of the same type as is ordinarily used to control the spark advance on the ignition distributor or an internal combustion engine. It includes a housing 13 having a diaphragm mounted therewithin, to which the operating stem 11 is connected. The operating stem 11 is encircled by a coil spring 12, which functions to urge the valve stem 8 upwardly toward the valve seat S.

The housing 13 has a vacuum connection 14 thereon on the lower side of the diaphragm, and carries a U-shaped clamp 15 on its upper surface which has bores 16 through the upper ends of the spaced arms thereof. The arms of the clamp 15 are secured to the valve body 1 by screws 17, which are passed through the bores 16.

The vacuum connection 14 is preferably connected to the same vacuum line as the pneumatic vacuum spark control mechanism, so that the actuator 32 is operated in proportion to the speed of the engine. The diaphragm of the actuator 32 functions to pull the operating stem 11 downwardly, and at the same time the coil spring 12 acts against the diaphragm to urge said operating stem 11 upwardly. The respective forces are so balanced that the spring 12 will be effective to override the diaphragm force when the engine is idling normally, under which condition the spring will be effective to engage the valve stem head H with the valve seat S to close the valve. As engine speed increases, the vacuum will increase, and the coil spring 12 will be progressively overcome, to thereby progressively open the valve 24.

Referring now to FIG. 4, a carburetor is shown at 18, and is fed with fuel through a line 19, with air of combustion being supplied through a line 20. The carburetor 18 is connected to the combustion chamber 22 of an internal combustion engine by a conduit means, which will normally be an intake pipe 21. The combustion chamber 22 discharges exhaust gases through a pipe 23, to the atmosphere.

The engine will exert a vacuum on the carburetor 18 through the intake pipe 21, and the carburetor will be effective to produce a mixture of fuel and air of combustion which will then be drawn through the intake pipe to the combustion chamber 22, where it is ignited and burned. As engine speed increases the vacuum in the intake pipe 21 will increase, thereby increasing the flow of fuel and air mixture from the carburetor 18. However, as was mentioned earlier, the resulting fuel and air of combustion mixture drawn from the carburetor 18 at the higher engine speeds will be fuel-rich, with the result that incomplete combustion of the fuel will occur. This causes a waste of fuel, and the generation of unwanted pollutants.

The valve 24 of the invention is connected to an inlet opening provided in the intake pipe 21. The inlet opening is threaded to accommodate the nipple 2, and should be located as close to the carburetor 18 as possible, to allow the maximum flow time for blending of the additional air of combustion with the fuel and air mixture flowing from the carburetor 18. The valve 24, as has been explained, is controlled by vacuum generated in response to engine speed, and is effective to add air into the intake pipe 21 proportionately with increasing speed. The air thus added leans the fuel and air mixture, and assures more complete burning of the fuel.

The method and apparatus of the invention are adaptable to existing internal combustion engines, and the apparatus is easily adjusted by use of the proportioning screw 7 to accommodate different engine characteristics. The apparatus is economical to fabricate and install, and is relatively maintenance-free in operation. The invention makes it possible to achieve a near optimum adjustment of the ratio between fuel and air of combustion, even in the higher range of engine speeds, whereby a better and more complete combustion is assured. The results include less carbon monoxide and particulate matter generation, increased engine power, substantial savings in gasoline consumption, and longer engine life. Thus, the objects set forth hereinabove for the invention are all fulfilled.

It is to be understood that variations and modifications of the invention are possible. For example, the air inlet bores 5 could be fitted with air filters, if desired, to prevent impairment of the purity of the fuel and air mixture.

What is claimed is:

1. Apparatus for controlling the air of combustion of a carburetor engine, said engine including a carburetor for producing a mixture of fuel and air, a combustion chamber, a vacuum operated pneumatic spark control system, and conduit means connecting said carburetor with said combustion chamber, said conduit means having an inlet opening therein, and said apparatus comprising: valve means connected with said conduit means inlet opening, and operable to be moved progressively from a closed position to an open position to admit a progressively increasing volume of additional air of combustion into said conduit means for blending with the mixture of fuel and air flowing therethrough from said carburetor to said combustion chamber, said valve means including: a valve body having a main bore and a reduced outlet bore therein, connected by a frusto-conical valve seat, said outlet bore being connected to said conduit means inlet opening, and said valve body further having at least one air inlet bore, said air inlet bore opening on said valve seat and extending tangentially to the longitudinal axis of said main bore whereby to encourage turbulence in the air flowing through said valve; and a valve stem received in said main bore, and having a conical head thereon that is engageable with said valve seat to close said valve; and actuator means connected to operate said valve means between said closed and said open positions in direct dependency upon the rotational speed of said carburetor engine, said actuator means including: an actuator housing having a diaphragm mounted therein, said diaphragm being connected with the vacuum of the pneumatic spark control system of said carburetor engine and being operated thereby; an operating stem carried by said diaphragm and connected directly with said valve stem; and resilient means mounted and arranged to urge said valve stem toward a valve "closed" position against valve opening force generated by said diaphragm.

2. Apparatus as recited in claim 1, further including:

an adjustable proportioning screw mounted within said outlet bore, and operable to adjust the rate of air flow through said outlet bore into said conduit means.

* * * * *